(12) United States Patent
Matsuo (10) Patent No.: US 11,593,038 B1
(45) Date of Patent: Feb. 28, 2023

(54) IMAGE FORMING SYSTEMS, INFORMATION PROCESSING APPARATUS, AND IMAGE FORMING METHOD THAT IS CAPABLE OF UTILIZING RESULT OF OFFSET PRINTING IN DIGITAL PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/491,445

(22) Filed: Sep. 30, 2021

(51) Int. Cl.
*G06F 3/12* (2006.01)

(52) U.S. Cl.
CPC ............ *G06F 3/1205* (2013.01); *G06F 3/125* (2013.01); *G06F 3/1267* (2013.01); *G06F 3/1282* (2013.01)

(58) Field of Classification Search
None
See application file for complete search history.

(56) References Cited

U.S. PATENT DOCUMENTS

| 2009/0219571 A1* | 9/2009 | Saito | G06F 3/1204 358/1.15 |
| 2011/0063682 A1* | 3/2011 | Kanamoto | G06K 15/1809 358/1.18 |
| 2021/0214567 A1* | 7/2021 | Claridge | C08G 63/916 |

FOREIGN PATENT DOCUMENTS

JP    2017-041087 A    2/2017

* cited by examiner

*Primary Examiner* — Frantz Bataille
(74) *Attorney, Agent, or Firm* — Hawaii Patent Services; Nathaniel K. Fedde; Kenton N. Fedde (57) ABSTRACT

Provided is an image forming system that can utilize result of offset printing in digital printing. The image forming system is capable for hybrid printing that performs offset printing and digital printing. A ticket creation unit creates a job ticket that includes print processing settings for each page. A digital setting unit acquires processing change information including change information at the time of processing in the offset printing to the job ticket created by the ticket creation unit, and it generates digital print setting for the digital printing. Further, the digital printing apparatus functions as a digital printing unit that outputs for digital printing based on the digital print settings generated by the digital setting unit.

18 Claims, 11 Drawing Sheets

```
<Resource>
  <RunList Pages="1" LogicalPage="1">
    <LayoutElement>
      <Imposed position="xxx xxx xxx xxx" />
      .....
    </LayoutElement>
  </RunList>
  <RunList Pages="2" LogicalPage="2">
    <LayoutElement>
      <Imposed position="xxx xxx xxx xxx" />
      .....
    </LayoutElement>
  </RunList>
  .....
</Resource>
```

FIRST PAGE PERFORMED IMPOSITION ON FIRST SHEET

SECOND PAGE PERFORMED IMPOSITION ON SECOND SHEET

```
<Resource>
  <RunList Pages="1" LogicalPage="1">
    <LayoutElement>
      <Offset RIP File FileName="xxxxx" Sheets="1" Imposed position="xxx xxx
xxx xxx" />
      .....
    </LayoutElement>
  </RunList>
  <RunList Pages="2" LogicalPage="2">
    <LayoutElement>
      <Offset RIP File FileName="xxxxx" Sheets="2" Imposed position="xxx xxx
xxx xxx" />
      .....
    </LayoutElement>
  </RunList>
```

FIRST PAGE PERFORMED IMPOSITION ON FIRST SHEET OF IMAGE DATA 320 IS PERFORMED IMPOSITION ON FIRST SHEET

SECOND PAGE PERFORMED IMPOSITION ON SECOND SHEET OF THE IMAGE DATA 320 IS PERFORMED IMPOSITION ON SECOND SHEET

220

FIG. 11    16-PAGE SADDLE STITCHING

IMAGE FORMING SYSTEMS, INFORMATION PROCESSING APPARATUS, AND IMAGE FORMING METHOD THAT IS CAPABLE OF UTILIZING RESULT OF OFFSET PRINTING IN DIGITAL PRINTING

BACKGROUND

The present disclosure particularly relates to an image forming system, an information processing apparatus, and an image forming method for hybrid printing that performs offset printing and digital printing.

In recent years, hybrid printing, which is a combination of offset printing and digital printing, has come to be used. In this hybrid printing, offset printing and digital printing are used properly according to the number of lots of printed matter. For example, a large amount of printed matter with a large number of lots is printed by a printing apparatus for the offset printing. On the other hand, on-demand publications and printed matter with small lots are often printed on a digital printing apparatus. The printing of this small lot is performed in a situation such as reprinting of the offset printed matter, reprinting by NG in the inspection of the offset printed matter, and the like. That is, when reprinting in small lots is required, the digital printing is often used as an alternative to the offset printing.

The printable paper width, imposition parameters, and the like, are different between the digital printing apparatus and the offset printing apparatus.

On the other hand, as a typical image forming system for hybrid printing, a system that manages a plurality of types of image forming apparatuses and performs print output is disclosed. In this system, offset printing or digital printing is specified for each page of job data composed of a plurality of pages. Based on this output destination designation information, job data to be transmitted to the offset printer and job data to be transmitted to the digital printer are generated. At that time, the number of impositions is determined and job data is generated based on the time required for image formation output and the time required for post-processing on the paper on which the image is formed. This imposition number is the number of pages formed on one recording medium. In this typical image forming system, the productivity of the entire system can be improved.

SUMMARY

An image forming system according to the present disclosure is an image forming system for hybrid printing that performs offset printing and digital printing, including: a ticket creation unit that creates a job ticket that includes print processing setting for each page; a digital setting unit that acquires processing change information including change information during processing in the offset printing based on the job ticket created by the ticket creation unit and generates digital print setting for the digital printing; and a digital printing unit that outputs for digital printing based on the digital print setting generated by the digital setting unit.

An information processing apparatus according to the present disclosure is an information processing apparatus that designs in an image formation system for hybrid printing that performs offset printing and digital printing, including: a ticket creation unit that creates a job ticket that includes print processing setting for each page; and a digital setting unit that acquires processing change information including change information during processing in the offset printing based on the job ticket created by the ticket creation unit and generates digital print setting for the digital printing.

An image forming method according to the present disclosure is an image forming method executed by an image forming system for hybrid printing that performs offset printing and digital printing, including the steps of: creating a job ticket that includes the print processing settings for each page; acquiring processing change information including change information during processing in the offset printing based on the created job ticket; generating digital print setting for the digital printing; and outputting for digital printing based on the digital print settings that is generated.

DETAILED DESCRIPTION

Embodiment

[System Configuration of Image Formation System X]

Figure 1:
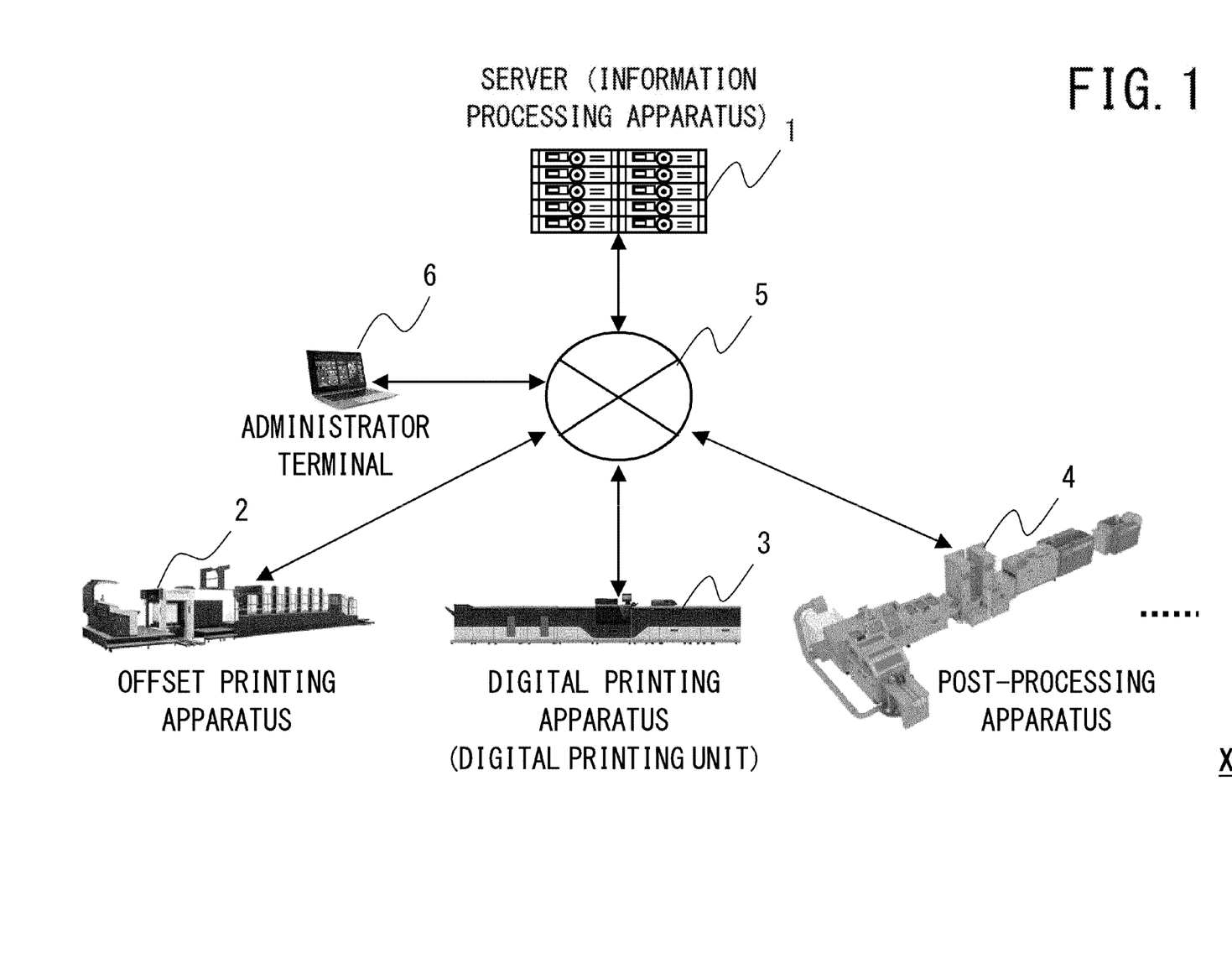
FIG. 1 is a system configuration diagram of an image forming system according to an embodiment of the present disclosure.

Firstly, with reference to FIG. 1, the overall system configuration of the image forming system X according to the present embodiment is described.

The image forming system X according to the present embodiment is a system that manages the workflow of hybrid printing in production printing (industrial printing). In production printing, the components of the final product are produced by dividing the labor in multiple processes. For example, in the case of bookbinding, the cover, the body (color), the body (black and white), the promotional material, the band, the shipping envelope, or the like, are processed as different jobs. Then, in the middle of the process, each job is combined and finished as a final product book (printed matter).

Here, in the image forming system X of the present embodiment, the final product such as an output book is set as an "order", and each component of the order is set as a job.

The image forming system X includes a server 1, an offset printing apparatus 2, a digital printing apparatus 3, a post-processing apparatus 4, and an administrator terminal 6, and each apparatus is connected by a network 5.

The server 1 is a server for managing the workflow. The server 1 is a PC (Personal Computer) server, a dedicated apparatus, a general-purpose apparatus, or the like, installed on a so-called cloud or at a user's position.

Further, the server 1 manages the workflow of production printing by executing the dedicated printing process management application software (hereinafter, simply referred to as "application"). The print order management application (hereinafter referred to as a "dedicated application") may execute a common platform that performs print design creation, user management, tenant management, security management, maintenance notification service, prepress processing management, storage management of each document, printing apparatus management, or the like.

Specifically, the server 1 transmits and receives various instructions and information to and from the offset printing apparatus 2, the digital printing apparatus 3, and the post-processing apparatus 4 in hybrid printing. As a result, the server 1 manages the status of each apparatus and requests processing.

The offset printing apparatus 2 is an automated printing apparatus that performs offset printing for printing a large amount (many lots).

The digital printing apparatus 3 is an industrial printer, or the like, which prints a smaller lot than the offset printing apparatus 2.

The digital printing apparatus 3 according to the present embodiment may be different from the offset printing apparatus 2 in the size, paper quality, recordable range, and the like, of the recording paper used for printing.

The post-processing apparatus 4 is various apparatuses for performing post-processing such as folding, collating, book-binding, and cutting of recording paper printed by the offset printing apparatus 2 or the digital printing apparatus 3.

The network 5 includes a LAN (Local Area Network), a wireless LAN (Wi-Fi), a WAN (Wide Area Network), a mobile phone network, an industrial network, a voice phone network, other dedicated line(s), or the like. The network 5 can send and receive various commands and data to and from each apparatus.

As shown in the template described later, a plurality of these apparatuses may exist depending on the application, the scale of printing, and the like.

In addition to this, the image forming system X includes various component apparatuses that execute various jobs of production printing and are managed by the server 1. The component apparatus includes, for example, a terminal for entry, a terminal for design proofreading, a prepress apparatus, a shipping management server, and the like.

Each apparatus can be connected to the server 1 by the network 5 by using a web browser, an application, or the like, of a PC or a smartphone. Alternatively, the server 1 and each apparatus may be directly connected via wire by using various interfaces.

The administrator terminal 6 is a printing administrator's terminal. The administrator accesses the server 1 by the administrator terminal 6, and he or she can perform design the print, entry of artworks, create a job, manage the prepress process, check the progress, request the process, or the like.

Figure 2:
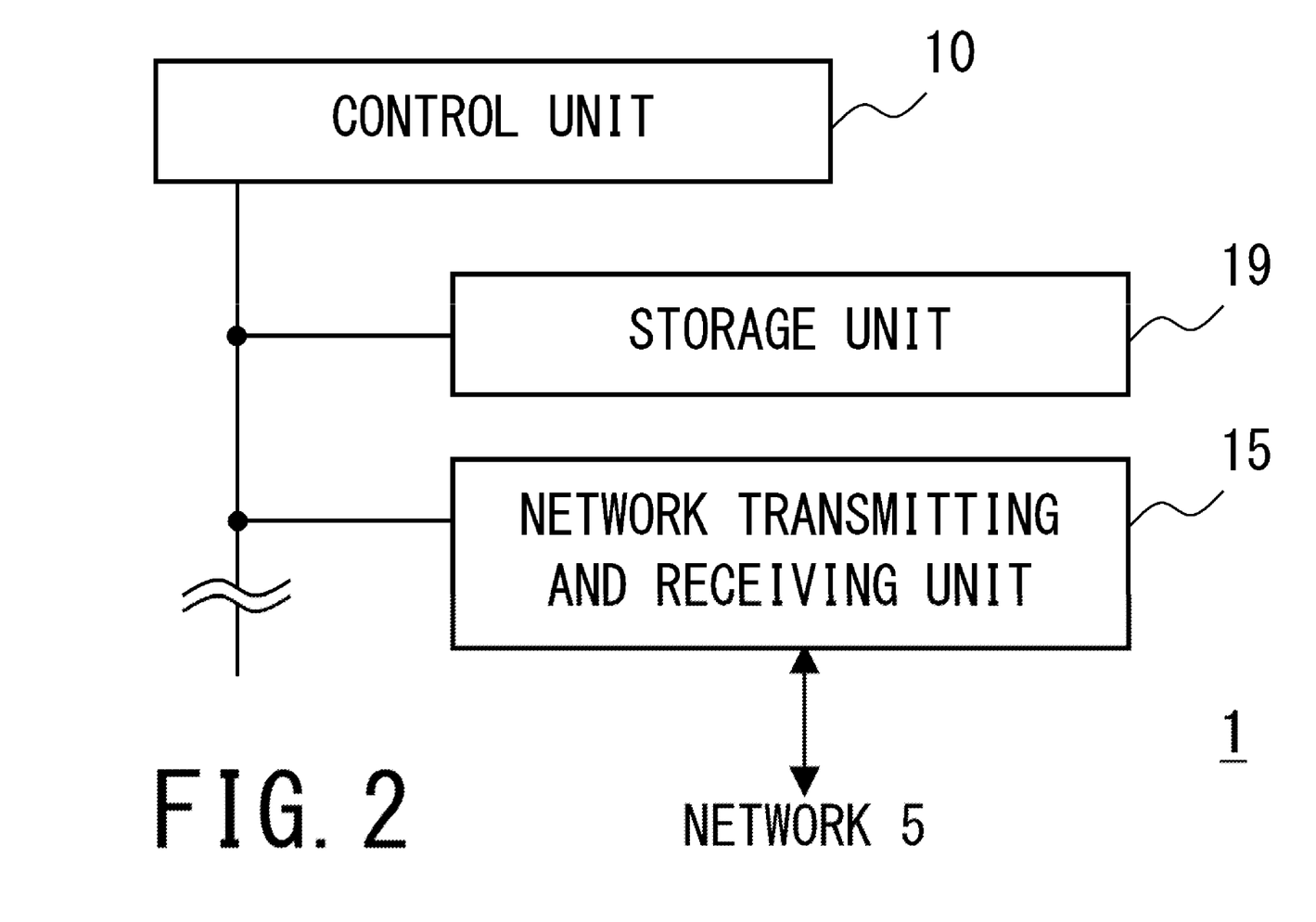
FIG. 2 is a block diagram showing the control configuration of the server as shown in FIG. 1.

Next, with reference to FIG. 2, the control configuration of the server 1 is described.

The server 1 includes a control unit 10, a network transmitting and receiving unit 15, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific application), or the like.

The control unit 10 reads out the control program stored in the ROM or HDD of the storage unit 19, expands the control program in the RAM, and executes it, so that the control unit 10 can be operated as each part of the functional block as described later. Further, the control unit 10 controls the entire apparatus according to the instruction information input from the administrator terminal 6 or a console.

The network transmitting and receiving unit 15 is a network connection unit including a LAN board, a wireless transmitter/receiver, and the like, for connecting to the network 5.

The network transmitting and receiving unit 15 transmits/receives data on a data communication line, and it transmits/receives a voice signal on a voice telephone line.

The storage unit 19 is a non-transitory recording medium, which is a semiconductor memory such as a ROM (Read Only Memory) and a RAM (Random Access Memory), an HDD (Hard Disk Drive), or the like.

A control program for controlling the operation of the server 1 is stored in the ROM or HDD of the storage unit 19. This control program includes an OS (Operating System), a middleware on the OS, service (daemon), various applications, database data, and the like. Among these, various applications include the above-mentioned printing process management application.

The storage unit 19 may also store account settings of users and the administrator of the image forming system X, and schedule information indicating the operating date and time and period of each apparatus of the image forming system X. That is, in the present embodiment, the operating status of each apparatus of the image forming system X is reflected in the schedule information.

In the server 1, the control unit 10 may be integrally formed such as a CPU having built-in GPU, a chip-on module package, an SOC (System On a Chip), or the like.

Further, the control unit 10 may have a built-in RAM, ROM, flash memory, or the like.

[Functional Configuration of Server 1]

Figure 3:
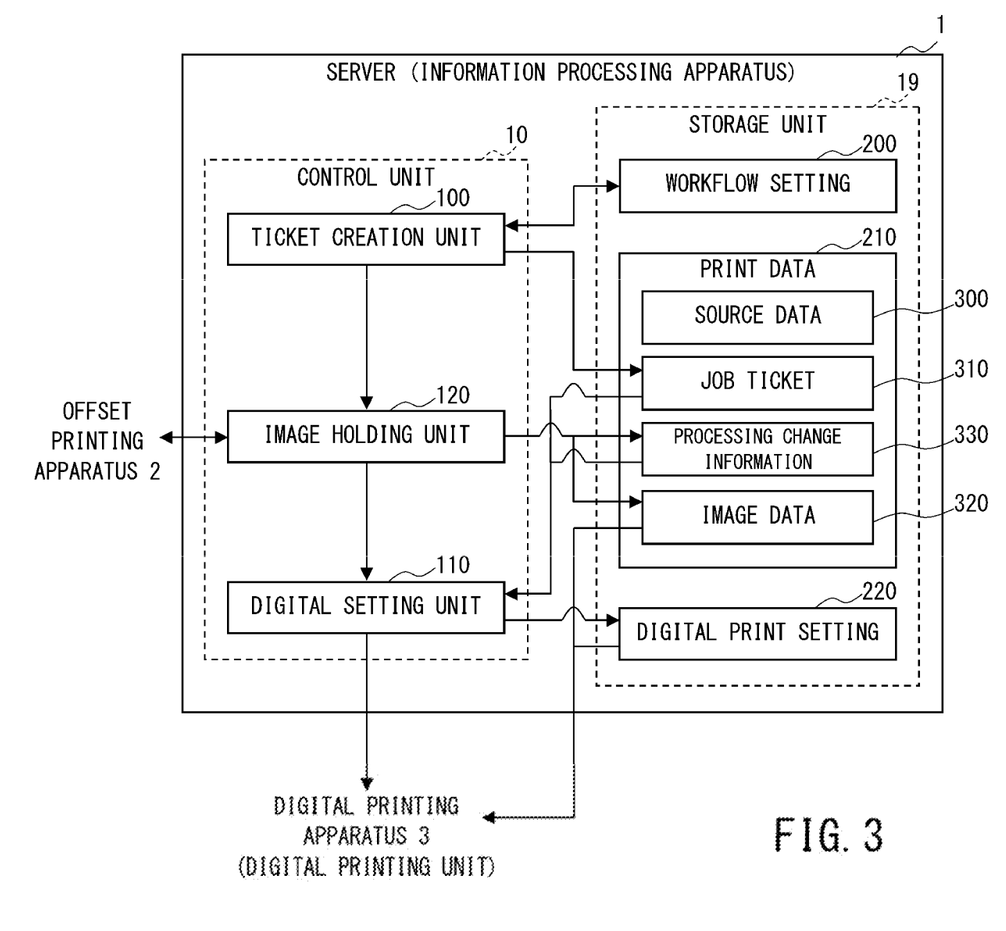
FIG. 3 is a block diagram showing a functional configuration of the image forming system according to the embodiment of the present disclosure.

Here, with reference to FIG. 3, the functional configuration of the server 1 is described.

The control unit 10 of the server 1 includes a ticket creation unit 100, a digital setting unit 110, and an image holding unit 120.

The storage unit 19 stores the workflow setting 200, the print data 210, and the digital print setting 220.

The ticket creation unit 100 creates a job ticket 310 including print processing setting for each page. The ticket creation unit 100 first creates a workflow template. Then, the ticket creation unit 100 creates a workflow for offset printing as a job ticket 310 from the workflow template.

The digital setting unit 110 acquires the processing change information 330 including the change information during the processing in the offset printing. On this basis, the digital setting unit 110 applies the processing change information 330 to the job ticket 310 created by the ticket creation unit 100 to generate the digital print setting 220 for the digital printing. In the present embodiment, the digital setting unit 110 generates a digital print setting 220 that uses the image data 320 held by the image holding unit 120 based on the processing change information 330. At this time, the digital setting unit 110 generates a digital print setting 220 to replace the offset printing.

Here, when a plurality of apparatuses exists, the digital setting unit 110 can generate the digital print setting 220 according to the combination of the plurality of apparatuses.

The image holding unit 120 holds the image data 320 for offset printing that has performed raster-in-process (hereinafter, abbreviated as "RIP") based on the job ticket 310. In the present embodiment, the image holding unit 120 RIPs the job ticket 310 for offset printing, and it stores the large image data 320, which is the unit to be printed on the recording paper after the RIP in the storage unit 19.

Further, in the present embodiment, the digital printing apparatus 3 functions as a digital printing unit that outputs for the digital printing based on the digital print setting 220 generated by the digital setting unit 110.

The workflow setting 200 creates a job for outputting an order as a job ticket 310 from a "workflow template" created in advance. In the present embodiment, the workflow template includes a workflow template for offset printing and a workflow template for digital printing associated thereto. In both offset printing and digital printing, from these templates, which apparatus the job is executed on is selected, and a workflow instruction is generated.

The print data 210 is data that summarizes various data used at the time of printing in production printing. In the present embodiment, the data used at the time of the offset printing is described mainly as the print data 210.

The print data 210 includes source data 300, job ticket 310, processing change information 330, and image data 320.

The source data 300 is data of printed matter where design is set according to the order. The source data 300 may be, for example, electronic document data such as PDF (Portable Document Format), or the like, PS (Postscript) data, other vector data, data in a format for entry, and the like.

The job ticket 310 is setting data for instructing an offset printing job. This instruction includes each workflow setting, such as the settings required for printing, which includes imposition position and post-processing. In the present embodiment, the job ticket 310 is created from a workflow template for offset printing according to an order. Further, the job ticket 310 may be described in, for example, JDF (Job Description Format) and/or JMF (Job Messaging Format).

The processing change information 330 is record information of changes during processing in the offset printing based on the job ticket 310. The processing change information 330 is information including, for example, data created by prepress processing in the offset printing, correction contents from the offset printing workflow, processing results in the offset printing, and the like. This modification contents includes a modification to the instruction in the job ticket 310 in the offset printing. Specifically, for example, correction of imposition position, correction of milling processing designation, correction of cutting width, and the like, are included. In addition, the processing result may include data of a plurality of times of trials for the result of the modification.

The image data 320 is image data that has been RIP-ed by the offset printing based on the job ticket 310. The image data 320 may be, for example, TIFF or other bitmap data. In addition, the image data 320 may be lossless-compressed or lossy compressed.

The digital print setting 220 is setting data for instructing digital printing. Specifically, the digital print setting 220 may be data of a workflow instruction for digital printing. In the present embodiment, the digital print setting 220 is created by referring to the processing change information 330 from the workflow template for digital printing. The digital print setting 220 may also be described, for example, in JDF and/or JMF.

Here, the control unit 10 of the server 1 is made to function as the ticket creation unit 100, the digital setting unit 110, and the image holding unit 120 by executing the control program stored in the storage unit 19.

In addition, each part of the server 1 described above serves as a hardware resource for executing the image forming method according to the present disclosure.

A part or any combination of the above-mentioned functional configurations may be configured in terms of hardware or circuit by IC, programmable logic, FPGA (Field-Programmable Gate Array), or the like.

[Workflow Ticket Creation Process by Server 1]

Next, with reference to FIGS. 4 to 7, the workflow ticket creation process by the server 1 according to the embodiment of the present disclosure is described.

Figure 4:
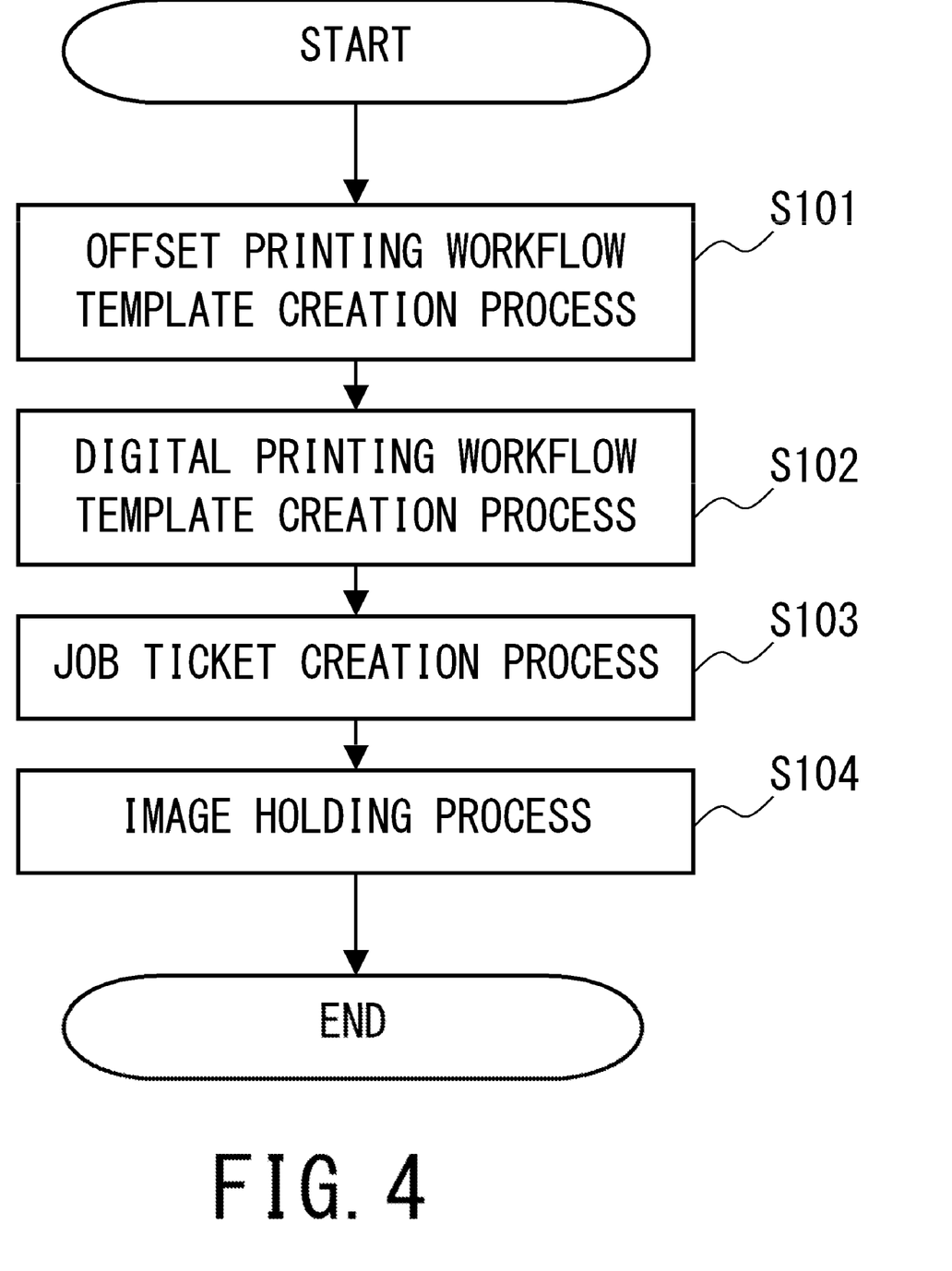
FIG. 4 is a flowchart of a workflow ticket creation process according to the embodiment of the present disclosure.

In the workflow ticket creation process of the present embodiment, firstly, workflow templates for the offset printing and the digital printing are created. Thereafter, a digital print processing workflow that replaces the workflow template for offset printing is prepared. Then, based on workflow template for the offset printing, to create a job ticket 310 for offset printing. Then, offset printing is performed with the job ticket 310, and the processing change information 330 is stored. Further, the image data 320 that was RIP-ed at the time of offset printing is stored.

In the workflow ticket creation process according to the present embodiment, the control unit 10 mainly executes the program stored in the storage unit 19 in cooperation with each unit and uses the hardware resources.

Hereinafter, with reference to the flowchart of FIG. 4, the details of the workflow ticket creation process are described step by step.

(Step S101)

Firstly, the ticket creation unit 100 performs the offset printing workflow template creation process.

The ticket creation unit 100 creates a workflow template for the offset printing according to the contents of the order of the printed matter. This workflow template may be described by the processing contents of the workflow in JDF and/or JMF. In addition, the offset printing workflow can be created in similar manner as a typical technique.

(Step S102)

Then, the ticket creation unit 100 performs a digital printing workflow template creation process.

The ticket creation unit 100 creates a workflow template for the digital printing according to the contents of the order for the same printed matter in order to utilize the data prepressed for the offset printing for the digital printing. Thus, the ticket creation unit 100 creates a template for a digital printing workflow that is an alternative to the offset printing workflow for the same printed matter. On this basis, the ticket creation unit 100 holds the template of the offset printing workflow and the template of the digital printing workflow in association with each other.

Figure 5:
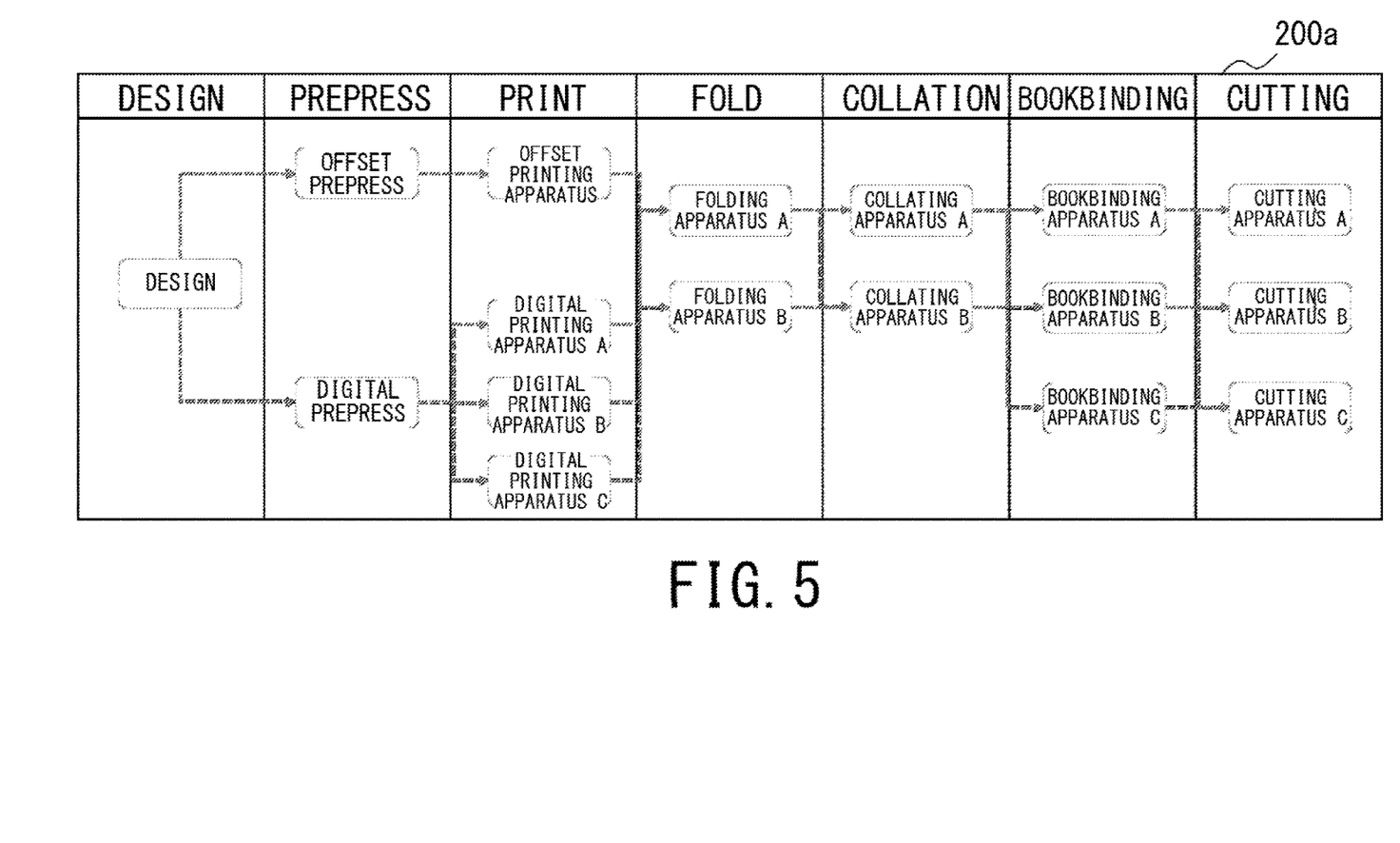
FIG. 5 is a conceptual diagram of an example workflow template created in the workflow ticket creation process as shown in FIG. 4.

FIG. 5 shows an example in which the workflow template for offset printing and the digital printing workflow template associated with the workflow template are displayed together as workflow template example 200*a*. In this example, for each process, a plurality of apparatuses can be selected for printing and post-processing.

More specifically, as is described later, a plurality of workflows, such as those in which each of the apparatuses described in the workflow template example 200a are connected by a line, may be selectable from this template. That is, one or any combination of apparatuses used in the actual job may be selectable in each process. On this basis, the selection of these apparatuses and the flow of processing may be selectable as a "workflow".

(Step S103)

Then, the ticket creation unit 100 performs a job ticket creation process.

The ticket creation unit 100 causes the administrator terminal 6 to execute a web browser or a dedicated application and to display a workflow template for offset printing on the screen. The ticket creation unit 100 causes the user to select which of the plurality of apparatuses to use in the GUI (Graphical User Interface) of this screen. The ticket creation unit 100 acquires the selection result and creates a job ticket 310 including the print processing setting of each page according to the selection result. Specifically, the ticket creation unit 100, as imposition setting, position of each page of the document performed imposition to the recording paper can be set in the job ticket 310. That is, the ticket creation unit 100 creates a job ticket 310 including information on each page corresponding to the imposition processing in the prepress processing of offset printing.

Figure 6:
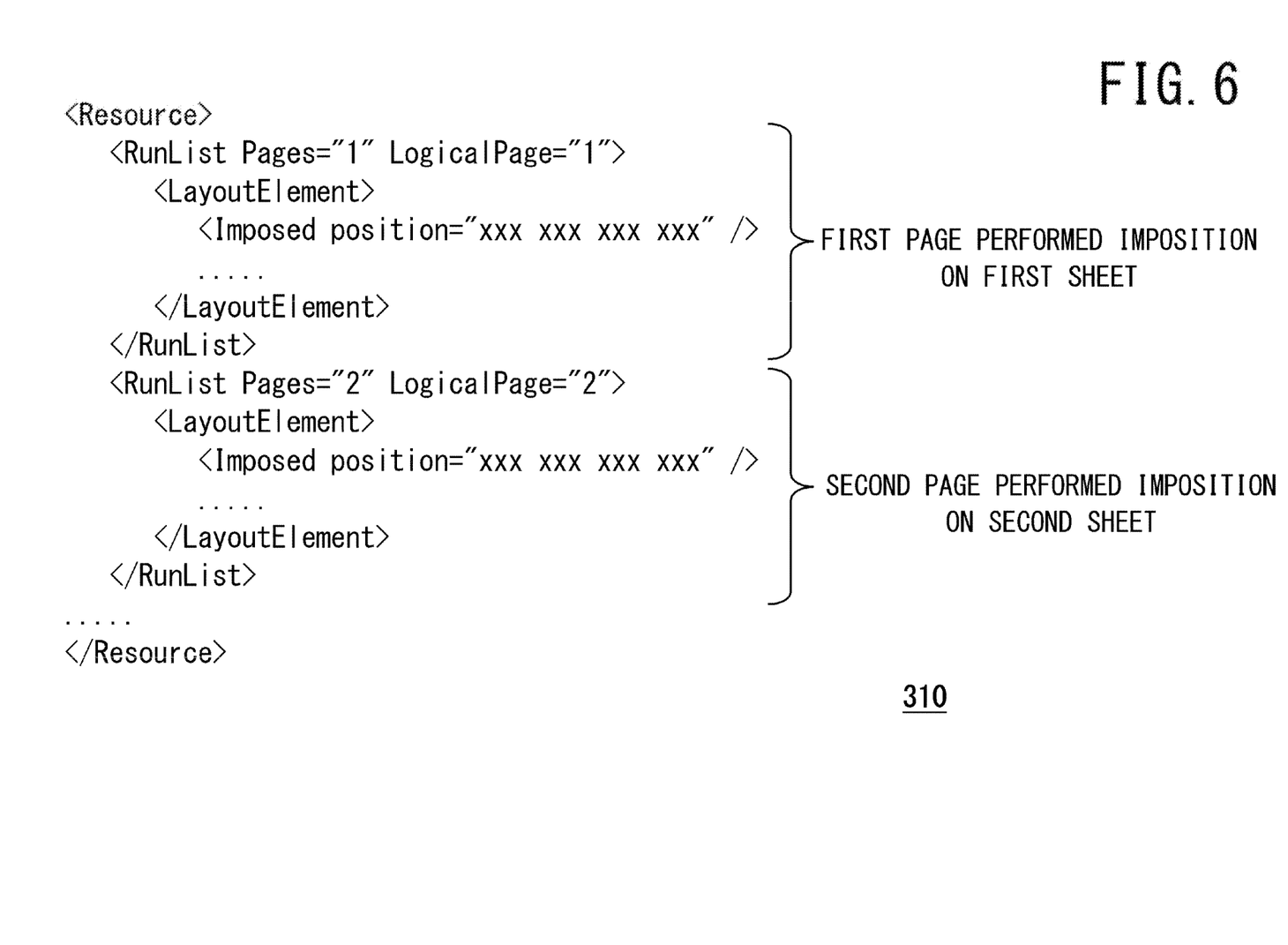
FIG. 6 is a conceptual diagram of the job ticket created by the job ticket creation process as shown in FIG. 4.

FIG. 6 shows an example of this job ticket 310. In this way, the job ticket 310 indicates the position of the image data 320 as like a tag of "Imposed position".

(Step S104)

Then, the image holding unit 120 performs the image holding process.

Here, in the offset printing apparatus 2, offset printing is performed based on the job ticket 310. At this time, the image holding unit 120 performs RIP from the source data 300 of the print data 210 based on the job ticket 310.

The image holding unit 120 holds the RIP-ed image data 320 for the offset printing in the print data 210 of the storage unit 19.

Figure 7:
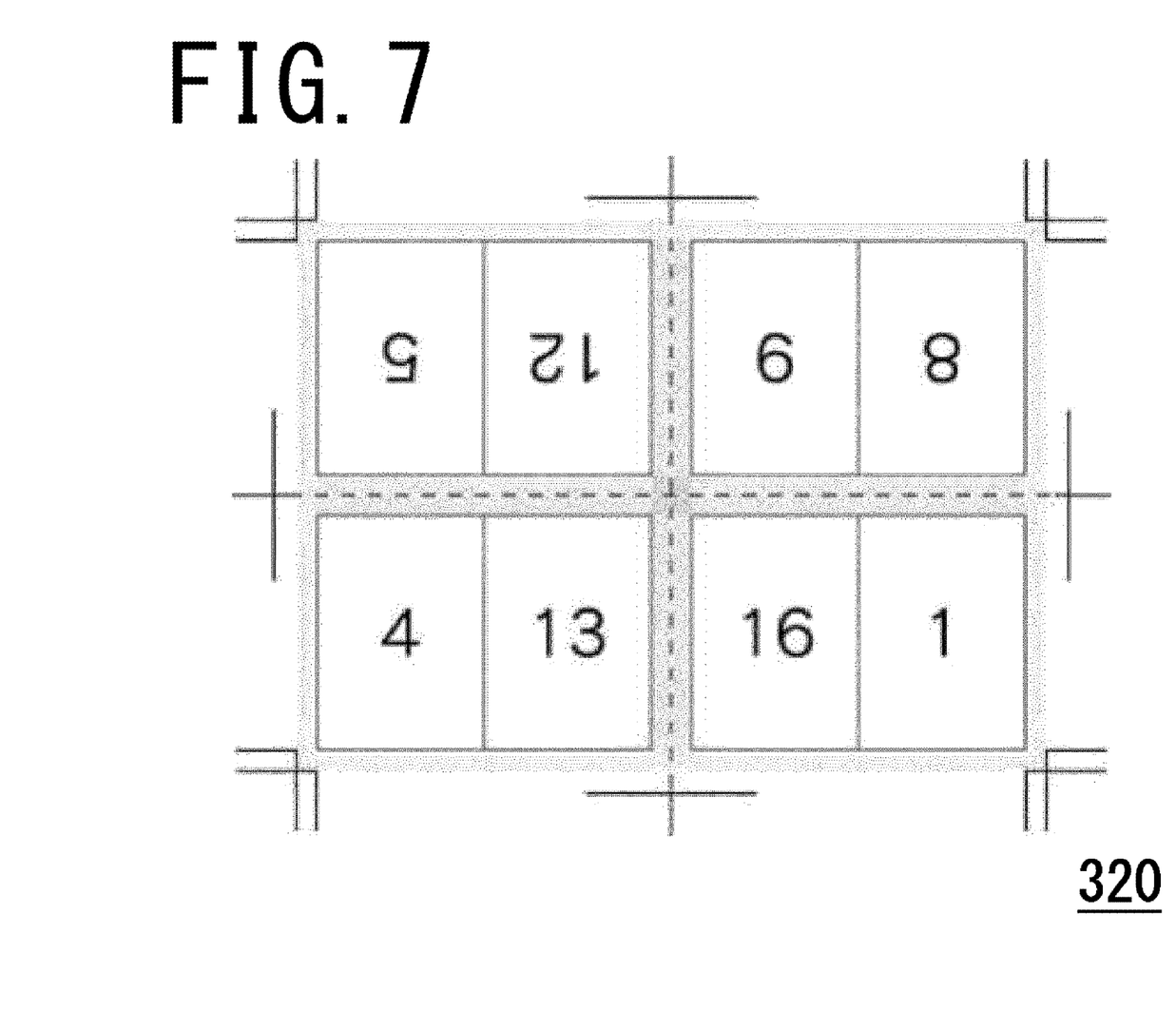
FIG. 7 is an example of image data held by the image holding process as shown in FIG. 4.

FIG. 7 shows an example of the first sheet of the RIP-ed image data 320. In this image data 320, register marks, folding positions, and the like, are also printed. The number of each page conceptually indicates the page number specified for imposition.

Further, the image holding unit 120 records the processing results such as various adjustments at the time of the offset printing in the processing change information 330 of the print data 210. This processing result may include the result of multiple stages such as data of prepress processing separately created for prepress, data at the time of output by the prepress apparatus, data adjusted after actually printing a small lot, data adjusted after that, and the like.

As described above, the workflow ticket creation process according to the embodiment of the present disclosure is completed.

[Reprint Processing by Server 1]

Next, with reference to FIGS. 8 to 11, the process of the server 1 according to the embodiment of the present disclosure is explained.

Figure 8:
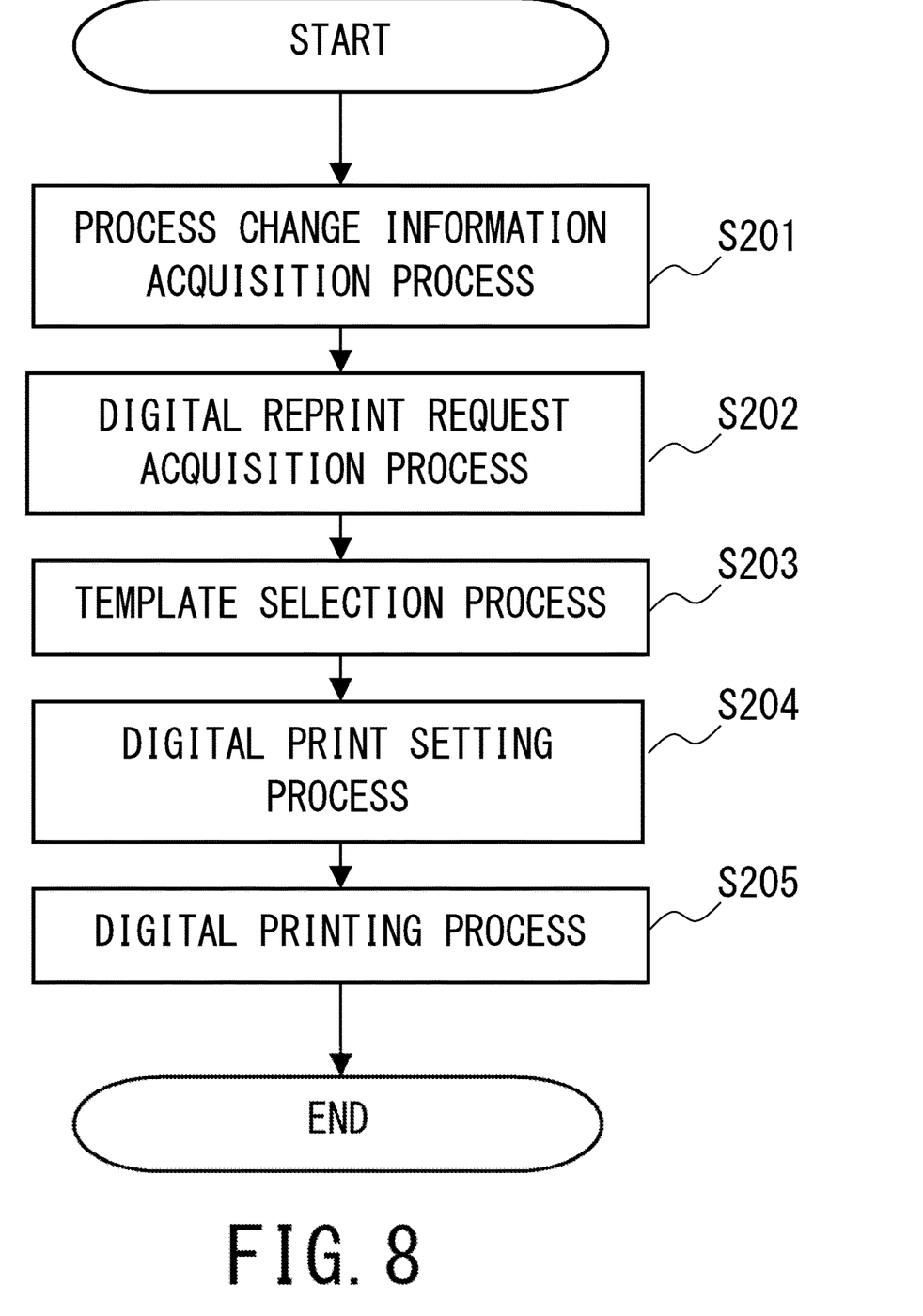
FIG. 8 is a flowchart of a reprinting process according to the embodiment of the present disclosure.

In this embodiment, digital printing is performed such as an alternative to offset printing when reprinting in small lots is required. At this time, the digital print setting 220 is generated based on the offset printing, and reprinting is performed based on the digital print setting 220.

In the reprinting process according to the present embodiment, the control unit 10 mainly executes the program stored in the storage unit 19 in cooperation with each unit and uses the hardware resources.

Hereinafter, with reference to the flowchart of FIG. 8, the details of the reprinting process are described step by step.

(Step S201) Firstly, the digital setting unit 110 performs processing change information acquisition process.

Figure 9:
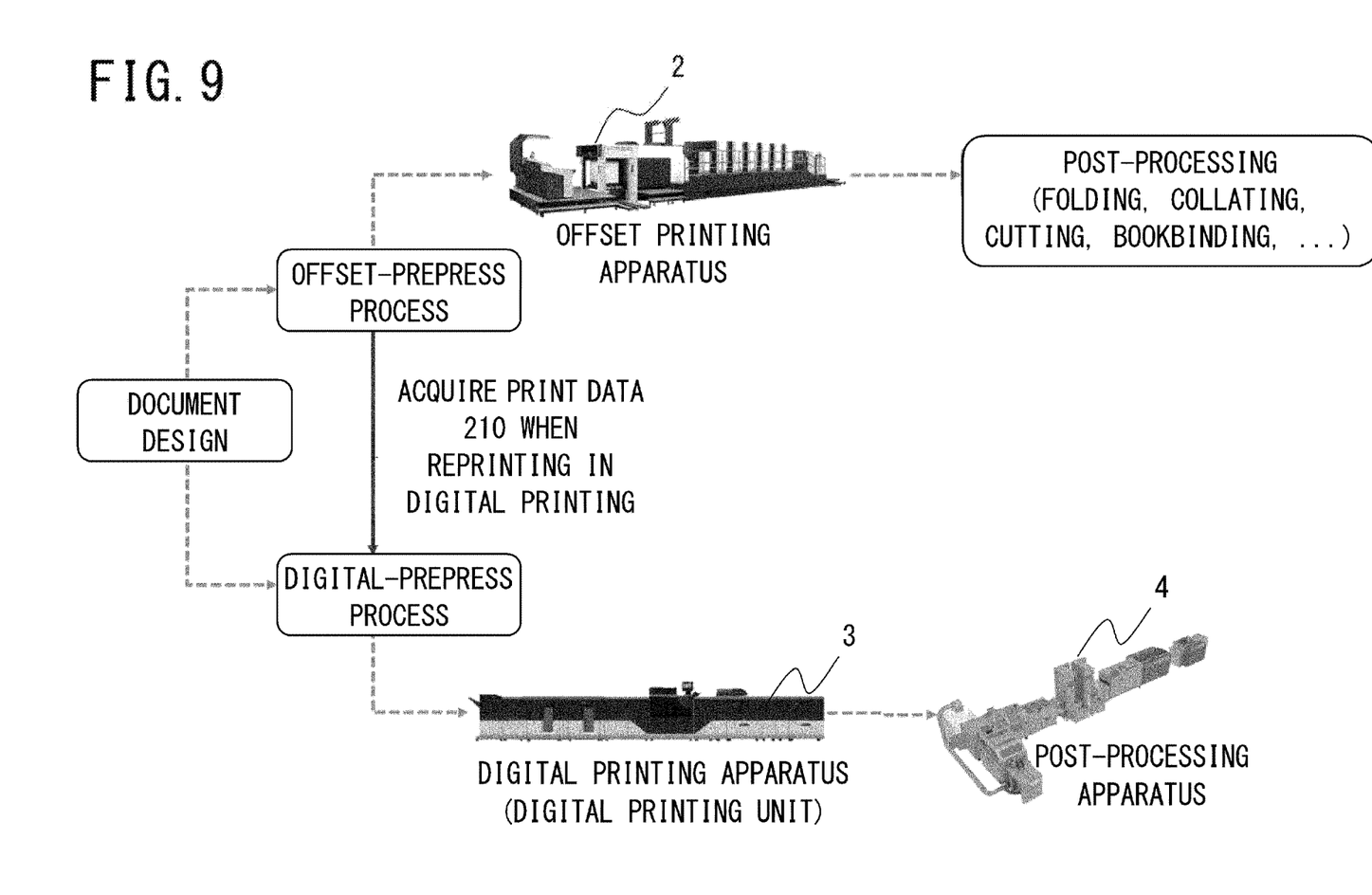
FIG. 9 is a conceptual diagram of the reprinting process as shown in FIG. 8.

According to FIG. 9, the digital setting unit 110 acquires print data 210 including change information at the time of processing in the offset printing. As a result, the digital setting unit 110 acquires the processing change information 330 of the print data 210 and stores it in the storage unit 19.

(Step S202)

Next, the digital setting unit 110 performs a digital reprint request acquisition process.

The digital setting unit 110 causes the web browser of the administrator terminal 6 or the dedicated application to display the GUI. Then, the digital setting unit 110 receives a reprint request in digital printing from the administrator terminal 6. At the time of this reprint request, the digital setting unit 110 also acquires information such as the order delivery date and the number of copies of the printed matter.

(Step S203)

Next, the digital setting unit 110 performs a template selection process.

The digital setting unit 110 causes the digital setting unit 110 to select the template corresponding to the job ticket 310 for which offset printing has been performed. Specifically, the digital setting unit 110 selects the digital printing workflow template associated with the offset printing workflow template.

Here, the digital setting unit 110 refers to the template of the digital printing workflow related to the template of the offset printing workflow. If a plurality of apparatuses is present in the template, the digital setting unit 110 selects the apparatus for the digital printing in this process. Specifically, the digital setting unit 110 selects the digital printing apparatus 3 and the post-processing apparatus 4 that can be used within the order delivery date of the reprint request. That is, the digital setting unit 110 can select any one of a plurality of apparatuses or a plurality of apparatuses in combination in each process, and it can generate a plurality of available workflows. On this basis, the digital setting unit 110 displays a list of available workflows on the administrator terminal 6 and causes the user to select the most suitable template in the GUI. As a result, the digital setting unit 110 can generate the digital print setting 220, which is a workflow instruction according to the combination of the apparatuses, as described below.

(Step S204)

Then, the digital setting unit 110 performs the digital print setting process.

The digital setting unit 110 generates the digital print setting 220, which is an instruction of the digital printing workflow. In the present embodiment, this workflow is an alternative to the workflow at the time of being performed the offset printing, as described above.

Here, the digital setting unit 110 refers to the offset printing processing change information 330 and reflects this to generate the digital print setting 220. That is, the digital setting unit 110 modifies the template of the selected digital printing workflow as described above according to the result of the offset printing process. This makes it possible to output the same as corrected at the time of offset printing.

Further, the digital setting unit 110 performs re-imposition the print data 210 as the prepress process for the digital printing when generating the digital print setting 220. At this time, the digital setting unit 110 uses the image data 320 held by the image holding unit 120 based on the processing change information 330. Specifically, the digital setting unit 110 does not perform imposition the source data 300 again, but it performs an imposition process that refers to the image data 320 held in the print data 210. That is, the digital setting unit 110 does not refer to the original document design as the source data of the imposition process, but it uses the image data 320 that has been RIP-ed by the offset printing. More specifically, the digital setting unit 110 may acquire each page of the document from the image data 320 that has been RIP-ed at the time of offset printing and perform imposition it on each sheet.

Figure 10:
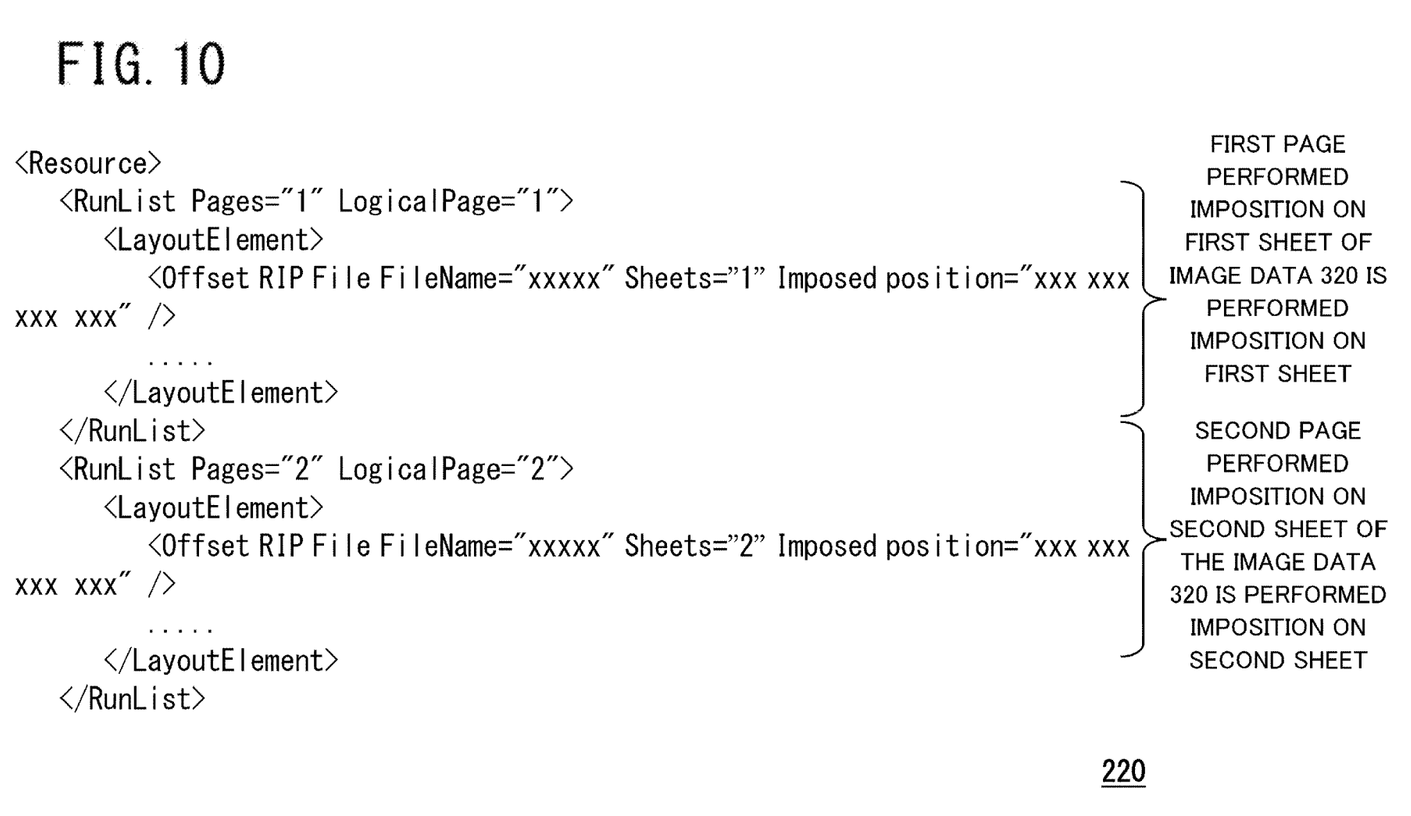
FIG. 10 is a conceptual diagram of the digital print setting generated by the digital print setting process as shown in FIG. 8.

FIG. 10 shows an example of the digital print setting 220 set in this way. Here, an example of imposition on each recording paper (sheet) by the "Offset RIP File" tag is shown. Specifically, the first page performed imposition on the first sheet of the image data 320 is performed imposition on the "first sheet" of the digital printing. Further, the second page performed imposition on the second sheet of the image data 320 is performed imposition on the "second sheet" of the digital printing.

Figure 11:
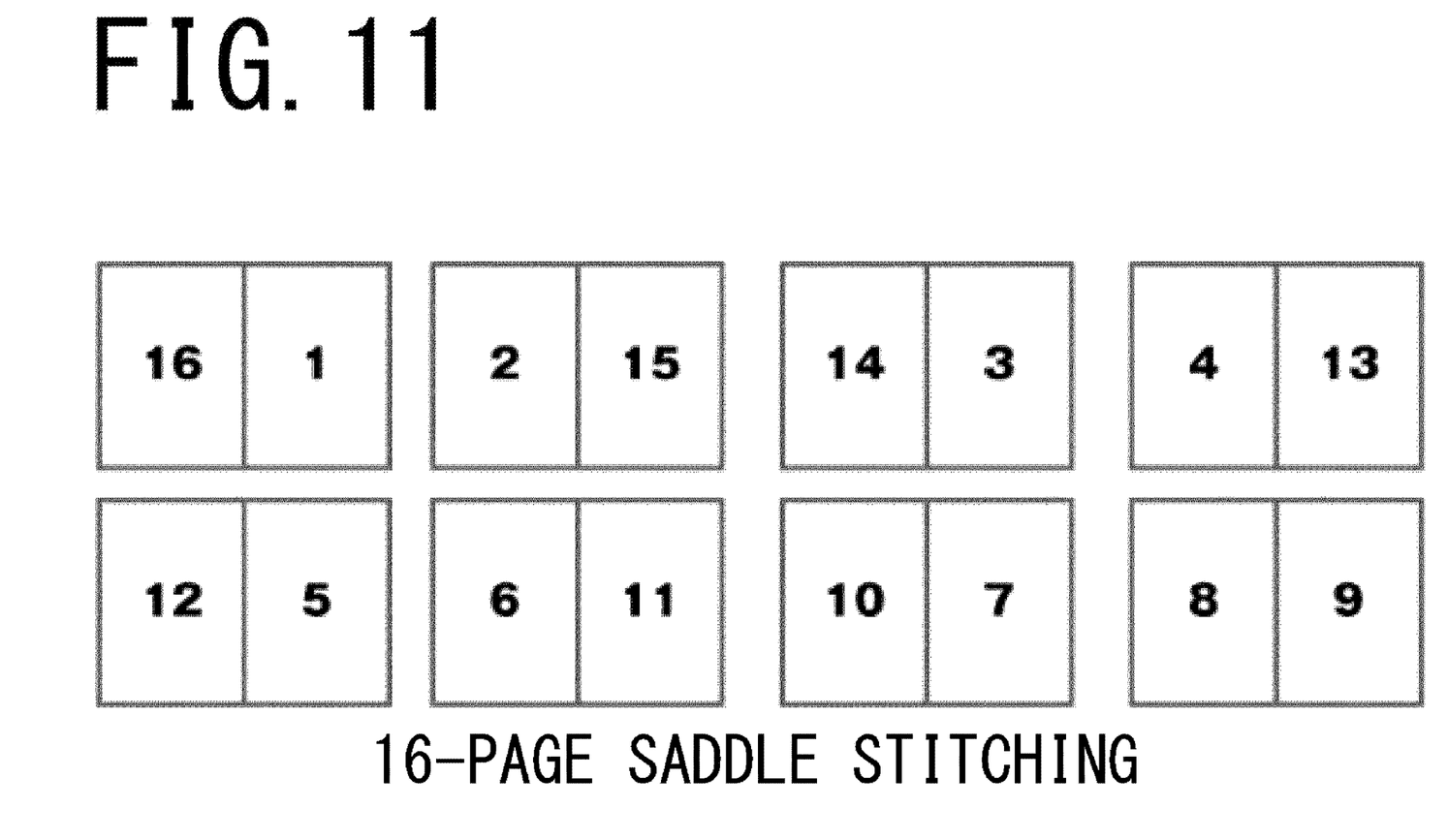
FIG. 11 is a conceptual diagram of imposition of digital printing targeted by the digital print setting as shown in FIG. 10.

FIG. 11 shows an example of imposition of each recording paper performed imposition for the digital printing in this way. In this example, an example of the digital print setting 220 performed imposition on eight sheets of the recording papers is shown as a 16-page middle binding.

(Step S205)

Next, the digital setting unit 110 performs a digital printing process.

The digital setting unit 110 instructs the selected digital printing apparatus 3 to perform the digital printing based on the digital print setting 220. As a result, the digital printing apparatus 3 can output for digital printing based on the digital print setting 220. On this basis, the digital setting unit 110 causes the post-processing apparatus 4 to perform post-processing as necessary.

At this time, since the result of offset printing is reflected as described above, it is possible to output substantially the same printed matter even in small lot printing.

As described above, the reprinting process according to the embodiment of the present disclosure is completed.

As configured in this way, the following effects can be obtained.

In the hybrid printing technology that combines the offset printing and the digital printing, the offset printing and the digital printing are used properly according to the number of lots of printed matter. The digital printing is also used for reprinting of offset-printed printed matter, errors in the offset printing process, that is, reprinting due to NG in inspection, or the like. In other words, when reprinting in small lots is required, the digital printing is used as an alternative to the offset printing.

Here, in a typical technology, printed matter is sorted into the offset printing and the digital printing on a page-by-page basis. In this technology, not only the printing process but also the work time of the post-processing process is taken into consideration, and the distribution is performed at the same time. Therefore, it can't be used as a substitute for the actual offset printing.

On the other hand, the image forming system X according to the embodiment of the present disclosure is an image forming system for hybrid printing that performs offset printing and digital printing, including: a ticket creation unit 100 that creates a job ticket 310 that includes print processing setting for each page; a digital setting unit 110 that acquires processing change information 330 including change information during processing in the offset printing based on the job ticket 310 created by the ticket creation unit 100 and generate digital print setting 220 for the digital printing; and a digital printing unit that outputs for digital printing based on the digital print setting 220 generated by the digital setting unit 110.

With this configuration, at the prepress stage in the hybrid printing, the digital print setting 220 is generated from the job ticket 310, which is the print processing setting for the offset printing, and the processing change information 330 of the offset printing result. Thus, the data used in the prepress processing for the offset printing can be utilized for digital printing. That is, as change information during offset printing processing, the data created by the prepress processing of the offset printing, the correction contents, processing results from the template, or the like, can be utilized in the processing of the digital printing.

As a result, when reprinting offset printing by digital printing, the work can be streamlined. Specifically, when performing the digital printing as the alternative to the offset printing, it is not necessary to create workflow instructions for digital printing from the source data 300 one by one. Therefore, the setting work in the digital printing can be made more efficient.

The image forming system X according to the present embodiment further includes an image holding unit 120 that holds the image data 320 for offset printing RIP-ed by the job ticket 310, and the digital setting unit 110 generates a digital print setting 220 that uses the image data 320 held by the image holding unit 120 based on the processing change information 330.

With this configuration, the RIP data in offset printing can be utilized in the digital printing. That is, instead of using the PDF of the original document as the source data for digital printing, the image data 320 RIP-ed by offset printing is referred to. As a result, the processing load of re-RIP of digital printing can be reduced and the efficiency can be improved. Further, image variation due to re-RIP can be prevented, and the digital print output with the same print quality can be performed. That is, by referring to the RIP data created by the offset printing prepress, the printing result of the digital printing can be matched with the printing result of the offset printing without performing re-RIP.

In addition, unlike a typical apparatus, it is not necessary to use a special center RIP, or the like.

In the image forming system X according to the present embodiment, the digital setting unit 110 creates a digital print setting 220 to replace the offset printing.

With this configuration, a printed matter of the digital printing similar to the offset printing can be obtained.

In addition, the digital printing workflow template may be associated and retained when generating the offset printing workflow template. As a result, the digital setting unit 110 can immediately acquire the associated digital printing workflow template in case of performing digital printing. Therefore, the digital print setting 220, which is a workflow instruction to which the output result of offset printing is applied, can be generated. As a result, it becomes easy to replace offset printing.

In the image forming system X according to the present embodiment, the digital setting unit 110 generates the digital print setting 220 according to the combination of a plurality of apparatuses when the plurality of apparatuses exists.

With this configuration, even when generating a digital printing workflow, a workflow where a plurality of available apparatuses is selected according to the scheduling of each apparatus can be generated. That is, similarly to the offset printing workflow, in the digital printing workflow, the workflow where a plurality of digital printing apparatuses 3 and post-processing apparatuses 4 are combined can be generated. Thereby, the printed matter can be output by efficiently using the plurality of apparatuses.

Other Embodiments

In addition, in the above-described embodiment, an example of simply storing the print data 210 for offset printing has been described.

On the other hand, in the image forming system according to the other embodiment of the present disclosure, the image holding unit 120 RIPs a replacement page, and the digital setting unit 110 regenerates the digital print setting 220 for the digital printing based on replacement information on the replacement page.

With such a configuration, for example, only the replacement page is RIP-ed by offset printing, and the digital print setting 220 is regenerated by using the replacement information of the page described in JDF and/or JMF. As a result, even if the second edition, or the like, is changed, it can be easily dealt with by digital printing. That is, in the small amount of digital printing, even if there is a replacement page, it is possible to output with the same quality.

Further, in the above-described embodiment, an example of storing all the offset-printed image data 320 has been described.

However, only the image data 320 selected by the specific criteria may be held. Specifically, only the image data 320 of the sheet containing the photograph where the print quality is important, only the image data 320 drawn by a unique font, and the like, may be held.

Further, depending on the type of image included in the image data 320, it may be possible to set whether to use lossless compression or lossy compression, change the compression method, and the like.

With this configuration, the storage area of the storage unit 19 of the server 1 can be used, efficiently. Further, data storage, and the like, can be made more efficient.

Further, in the above-described embodiment, an example in which the image data 320 in the offset printing is referred to the digital printing is described.

However, conversely, image data of the offset printing may be generated from image data 320 RIP-ed in the digital printing.

Further, it may be possible to convert the image data 320 RIP-ed by the digital printing into the source data 300 and use it in the offset printing.

With this configuration, data for the offset printing can be generated based on a small amount of data for the digital printing. Therefore, it becomes possible to handle various orders.

Further, in the above-described embodiment, an example in which the same image data 320 used in offset printing is used in digital printing has been described. However, when the image data 320 is used for digital printing, it can be processed by a specific processing method. The specific processing method may be, for example, color conversion, resolution conversion, dithering change, or the like, in order to suppress a difference in appearance from the offset printing in the digital printing. Further, it may be possible to change the post-processing such as changing from glossy to matte style according to the processing of the image data 320.

As a result, even if the offset printing apparatus 2 and the digital printing apparatus 3 have different color reproducibility and recording paper to be used, or the like, printing with the similar quality can be performed.

Further, it goes without saying that the configuration and operation of the above-described embodiment are examples and can be appropriately modified and executed without departing from the gist of the present disclosure.

What is claimed is:

1. An image forming system for hybrid printing that performs offset printing and digital printing, comprising:
   a ticket creation unit configured to create a job ticket that includes a print processing setting for each page;
   a digital setting unit configured to acquire processing change information including change information during processing in the offset printing based on the job ticket created by the ticket creation unit and generate a digital print setting for the digital printing; and
   a digital printing unit configured to output digital printing based on the digital print setting generated by the digital setting unit, wherein
   the processing change information is information including any one of data generated by a prepress processing in the offset printing, correction contents from offset printing workflow, and a processing result in the offset printing.

2. The image forming system according to claim 1, further comprising:
   an image holding unit configured to hold the image data for offset printing that has been raster-in-processed by the job ticket; and wherein
   the digital setting unit generates the digital print setting wherein the digital print setting uses the image data held by the image holding unit based on the processing change information, and
   the digital setting unit performs an imposition process that refers to the image data.

3. The image forming system according to claim 1, wherein
   the digital setting unit generates the digital print setting to replace the offset printing in which the output is similar to as corrected at the offset printing.

4. The image forming system according to claim 1, wherein
   the digital setting unit generates the digital print setting according to a combination of a plurality of apparatuses when the plurality of apparatuses exists by selecting a plurality of available apparatuses according to scheduling of each apparatus.

5. The image forming system according to claim 2, wherein
   the image holding unit raster-in-processes a replacement page by using page replacement information of a page in the offset printing; and
   the digital setting unit regenerates the digital print setting for the digital printing based on replacement information on the replacement page.

6. An information processing apparatus that designs in an image formation system for hybrid printing that performs offset printing and digital printing, comprising:
   a ticket creation unit configured to create a job ticket that includes a print processing setting for each page; and
   a digital setting unit configured to acquire processing change information including change information during processing in the offset printing based on the job ticket created by the ticket creation unit and generate a digital print setting for the digital printing, wherein the processing change information is information including any one of data generated by a prepress processing in the offset printing, correction contents from offset printing workflow, and a processing result in the offset printing.

7. The information processing apparatus according to claim 6, further comprising:
an image holding unit configured to hold the image data for offset printing that has been raster-in-processed by the job ticket; and wherein
the digital setting unit generates the digital print setting wherein the digital print setting uses the image data held by the image holding unit based on the processing change information, and
the digital setting unit performs an imposition process that refers to the image data.

8. The information processing apparatus according to claim 6, wherein
the digital setting unit generates the digital print setting to replace the offset printing in which the output is similar to as corrected at the offset printing.

9. The information processing apparatus according to claim 6, wherein
the digital setting unit generates the digital print setting according to a combination of a plurality of apparatuses when the plurality of apparatuses exists by selecting a plurality of available apparatuses according to scheduling of each apparatus.

10. The information processing apparatus according to claim 7, wherein
the image holding unit raster-in-processes a replacement page by using page replacement information of a page in the offset printing; and
the digital setting unit regenerates the digital print setting for the digital printing based on replacement information on the replacement page.

11. An image forming method executed by an image forming system for hybrid printing that performs offset printing and digital printing, comprising the steps of:
creating a job ticket that includes print processing settings for each page;
acquiring processing change information including change information during processing in the offset printing based on the created job ticket;
generating a digital print setting for the digital printing; and
outputting for digital printing based on the digital print setting that is generated, wherein
the processing change information is information including any one of data generated by a prepress processing in the offset printing, correction contents from offset printing workflow, and a processing result in the offset printing.

12. The image forming method according to claim 11, further comprising:
holding the image data for offset printing that has been raster-in-processed by the job ticket;
generating the digital print setting wherein the digital print setting uses the held image data based on the processing change information; and
performs an imposition process that refers to the image data.

13. The image forming method according to claim 11, wherein
generating the digital print setting to replace the offset printing in which the output is similar to as corrected at the offset printing.

14. The image forming method according to claim 11, wherein
generating the digital print setting according to the combination of a plurality of apparatuses when the plurality of apparatuses exists by selecting a plurality of available apparatuses according to scheduling of each apparatus.

15. The image forming method according to claim 12, wherein
raster-in-processing a replacement page by using page replacement information of a page in the offset printing; and
regenerating the digital print setting for the digital printing based on replacement information on the replacement page.

16. The image forming system according to claim 1, wherein
the processing change information includes correction of imposition position, correction of milling processing designation, and correction of cutting width.

17. The image forming system according to claim 3, wherein
a digital printing workflow template is associated and retained when generating an offset printing workflow template; and
the digital setting unit acquires the associated digital printing workflow template in case of performing the digital printing and generates the digital printing setting, which is a workflow instruction to which the output result of the offset printing is applied.

18. The image forming system according to claim 4, wherein
the digital setting unit generates a workflow in which a plurality of digital printing apparatuses and a plurality of post-processing apparatuses are combined.

\* \* \* \* \*